US009536478B2

(12) United States Patent
Hesselmark

(10) Patent No.: US 9,536,478 B2
(45) Date of Patent: Jan. 3, 2017

(54) COLOR DEPENDENT CONTENT ADAPTIVE BACKLIGHT CONTROL

(71) Applicant: Sony Corporation, Tokyo (JP)

(72) Inventor: Valter Hesselmark, Lund (SE)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 14/648,327

(22) PCT Filed: Nov. 26, 2013

(86) PCT No.: PCT/IB2013/060426
§ 371 (c)(1),
(2) Date: May 29, 2015

(87) PCT Pub. No.: WO2015/079285
PCT Pub. Date: Jun. 4, 2015

(65) Prior Publication Data
US 2015/0371593 A1 Dec. 24, 2015

(51) Int. Cl.
*G06T 11/20* (2006.01)
*G09G 3/34* (2006.01)

(52) U.S. Cl.
CPC .......... *G09G 3/3413* (2013.01); *G09G 3/3426* (2013.01); *G09G 2320/0271* (2013.01);
(Continued)

(58) Field of Classification Search
None
See application file for complete search history.

(56) References Cited

U.S. PATENT DOCUMENTS

2006/0209003 A1* 9/2006 Kerofsky ................. G09G 3/22
345/102
2016/0055788 A1* 2/2016 Gandhi ................ G09G 3/2029
345/693

FOREIGN PATENT DOCUMENTS

WO 2010141739 A2 12/2010

OTHER PUBLICATIONS

De Greef, P., et al., "39.1: Adaptive Dimming and Boosting Backlight for LCD-TV Systems", SID International Symposium, Society for Information Display, May 20, 2007, pp. 1332-1335, vol. 38, Los Angeles, USA, XP007013259.

(Continued)

*Primary Examiner* — Xiao Wu
*Assistant Examiner* — Mohammad H Akhavannik
(74) *Attorney, Agent, or Firm* — Coats & Bennett, PLLC

(57) ABSTRACT

A backlight for a LCD comprises two or LED arrays, each corresponding to a respective color channel. A control circuit controls the supply current to each LED array separately based on the content of a displayed image to reduce the current consumption of the backlight. The control circuit generates separate histograms of transmittance values for each of two or more color channels in the image, and stretches the histograms for the two or more color channels by respective stretching factors to generate a stretched image. The stretched image is displayed on the LCD. The control circuit further control the current supply to the two or more LED arrays in the backlight to reduce a brightness of light emitted by the two or more LED arrays in dependence on respective stretching factors for the corresponding color channel.

9 Claims, 6 Drawing Sheets

(52) U.S. Cl.
CPC ............... *G09G 2320/0646* (2013.01); *G09G 2330/021* (2013.01); *G09G 2360/16* (2013.01)

(56) References Cited

OTHER PUBLICATIONS

International Search Report for PCT Application No. PCT/IB2013/060426 mailed Sep. 10, 2014.

* cited by examiner

COLOR DEPENDENT CONTENT ADAPTIVE BACKLIGHT CONTROL

TECHNICAL FIELD

The present invention relates generally to backlights for liquid crystal displays and, more particularly, to content adaptive backlight control for reducing power consumption of backlights in LCD's.

BACKGROUND

Smartphones, tablets and other portable electronic devices typically use liquid crystal displays with backlights to enhance visibility of the display. The intensity of the backlight may be adjusted based on ambient conditions to improve visibility of the backlight. The backlight accounts for a substantial portion of the total power consumption of the display. Smartphones and tablets with large displays are appealing to consumers. However, increasing the size of the display to meet this consumer demand increases the current consumption of the display and reduces the battery life of the device.

Content Adaptive Backlight Control (CABC), also known as Dynamic Backlight Control (DBC) or Content Adaptive Backlight (CABL), is a technique used in the past to reduce the power consumption of a backlight in an LCD. One CABC approach linearly stretches the histogram of an image to use the full range of the LCD display while simultaneously reducing the backlight by a corresponding amount. These adjustments are done in a way that does not negatively impact the viewer's perception of the image. This CABC approach reduces power consumption of the backlight while preserving the image quality of the displayed image.

As an example, assume that the highest pixel value in a displayed image is stretched by 11.7% to maximize the light transmittance of the pixel. In this example, all the pixel values in the displayed are increased by 11.7%. The backlight can then be dimmed by a corresponding amount to reduce power consumption.

While histogram-based CABC achieves some reduction in the power consumption of a backlight for an LCD, the current savings is limited by the highest pixel value in the displayed image. If any of the color channels in the displayed image are saturated, there will be little or no savings in current consumption. Accordingly, improved techniques are needed to further reduce power consumption in the backlight for an LCD.

SUMMARY

The present disclosure relates to content adaptive backlight control (CABC) to reduce power consumption in an LCD. The CABC techniques herein described work in conjunction with backlights comprising two or more light emitting diode (LED) arrays of different color. In exemplary embodiments of the disclosure, histogram stretching and backlight control is performed separately for two or more different color channels in an image. The color channels may comprises primary color channels, such as red, green and blue channels, or composite color channels, such as a white color channel. For example, the backlight may comprise a red LED array, a green LED array, and a blue LED array. The intensity of the light emitted from each LED array is separately controlled based on a corresponding histogram of the displayed image. In the above example, the histogram of each color channel (e.g., RGB channels) is linearly stretched and the intensity of the light emitted by the LED arrays is adjusted by a corresponding amount.

Exemplary embodiments of the invention comprise methods of controlling power consumption of a backlight in an electronic display, wherein the backlight comprises two or more LED arrays, each corresponding to a respective color channel in an image to be displayed. In one embodiment, the method comprises generating separate histograms of transmittance values for two or more of said color channels in said image; stretching the histograms for said two or more color channels by respective stretching factors to generate a stretched image; displaying the stretched image on said electronic display; and separately controlling two or more LED arrays in said backlight to reduce a brightness of light emitted by said two or more LED arrays in dependence on respective stretching factors applied to the histograms for the corresponding color channels.

In some embodiments of the method, the two or more color channels comprise primary color channels and stretching the histograms for said two or more color channels comprises stretching the histograms for each primary color channel independently.

In some embodiments of the method, the two or more color channels comprises at least one composite color channel and at least one primary color channel and stretching the histograms for said two or more color channels comprises stretching the histogram for said primary color channel in dependence stretching of the histogram for the composite color channel.

In some embodiments of the method, separately controlling two or more LED arrays in said backlight to reduce a brightness of light emitted by said two or more LED arrays in dependence on respective stretching factors for the corresponding color channel comprises reducing a supply current to each LED array proportionally to the stretching of the histogram for the corresponding color channel.

Other embodiments of the invention comprise a display assembly for an electronic device. The display assembly according to one embodiment comprises an electronic display; a backlight for said electronic display including two or more LED arrays; and a control circuit for controlling the electronic display and backlight to reduce power consumption of the backlight. The control circuit is configured to generate separate histograms of transmittance values for two or more of said color channels in said image; stretch the histograms for said two or more color channels by respective stretching factors to generate a stretched image; output the stretched image to said electronic display for display; and separately control two or more LED arrays in said backlight to reduce a brightness of light emitted by said two or more LED arrays in dependence on respective stretching factors for the corresponding color channel.

In some embodiments of the display assembly, the two or more color channels comprise primary color channels and, to stretch the histograms for said two or more color channels, the control circuit is configured to stretch the histograms for each primary color channel independently.

In some embodiments of the display assembly, the two or more color channels comprises at least one composite color channel and at least one primary color channel and, to stretch the histograms for said two or more color channels, the control circuit is configured to stretch the histogram for said primary color channel in dependence stretching of the histogram for the composite color channel.

In some embodiments of the display assembly, to separately control two or more LED arrays in said backlight, the control circuit is configured to reduce a supply current to each LED array proportionally to the stretching of the histogram for the corresponding color channel.

Other embodiments of the invention comprise an electronic device electronic device comprising a user input device, a display assembly including a display and a backlight with two or more LED arrays, and a processor configured to receive user input via said user input device and to output information for display by said display. The display assembly further comprises a control circuit for controlling the display and backlight to reduce power consumption of the backlight. The control circuit is configured to generate separate histograms of transmittance values for two or more of said color channels in said image; stretch the histograms for said two or more color channels by respective stretching factors to generate a stretched image; output the stretched image to said electronic display for display; and separately control two or more LED arrays in said backlight to reduce a brightness of light emitted by said two or more LED arrays in dependence In some embodiments of the electronic device, the two or more color channels comprise primary color channels and, to stretch the histograms for said two or more color channels, the control circuit is configured to stretch the histograms for each primary color channel independently.

In some embodiments of the electronic device, the two or more color channels comprises at least one composite color channel and at least one primary color channel and, to stretch the histograms for said two or more color channels, the control circuit is configured to stretch the histogram for said primary color channel in dependence stretching of the histogram for the composite color channel.

In some embodiments of the electronic device, to separately control two or more LED arrays in said backlight, the control circuit is configured to reduce a supply current to each LED array proportionally to the stretching of the histogram for the corresponding color channel.

The content adaptive backlight control techniques implemented in embodiments of the present disclosure allow for greater reduction in power consumption of the backlight without negatively impacting a viewer's perception of the displayed images. The content adaptive backlight control techniques are well-suited for portable electronic devices, such as smartphones and tablets, but are also useful in electronic device with fixed power supplies, such as televisions and display monitors.

DETAILED DESCRIPTION

Figure 1:
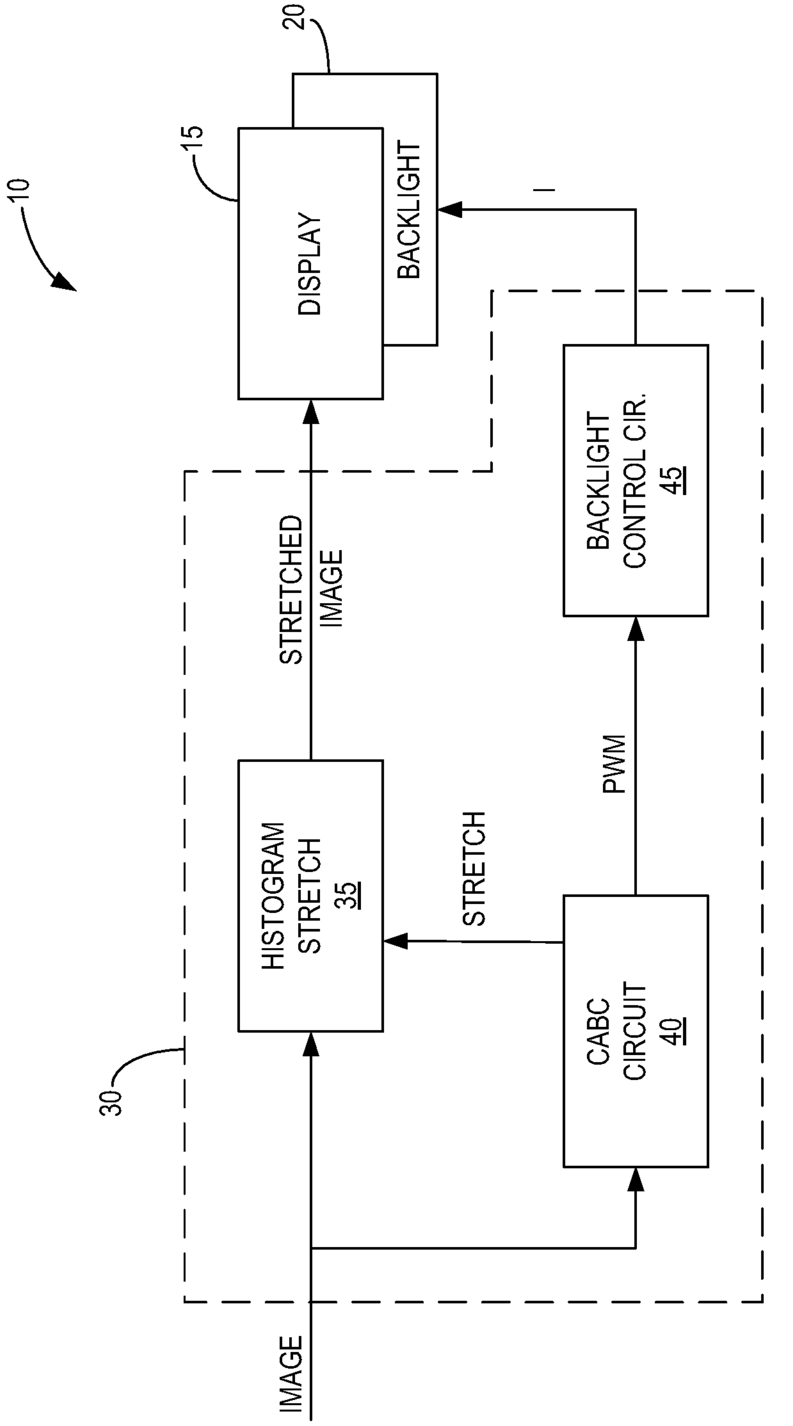
FIG. 1 illustrates a display assembly according to one exemplary embodiment including a LCD and multicolor LED backlight.

Referring now to the drawings, FIG. 1 illustrates a display assembly indicated generally by the numeral 10 according to one embodiment of the disclosure. The display assembly 10 may be used, for example, to reduce power consumption of a backlight in electronic devices such as smart phones, tablets, laptop computers, and other battery powered electronic devices. Those skilled in the art will appreciate, however, that the teachings of the present disclosure are not limited to these use cases and may be used in televisions, computer monitors, and other electronic devices with permanent power sources.

Figure 2:
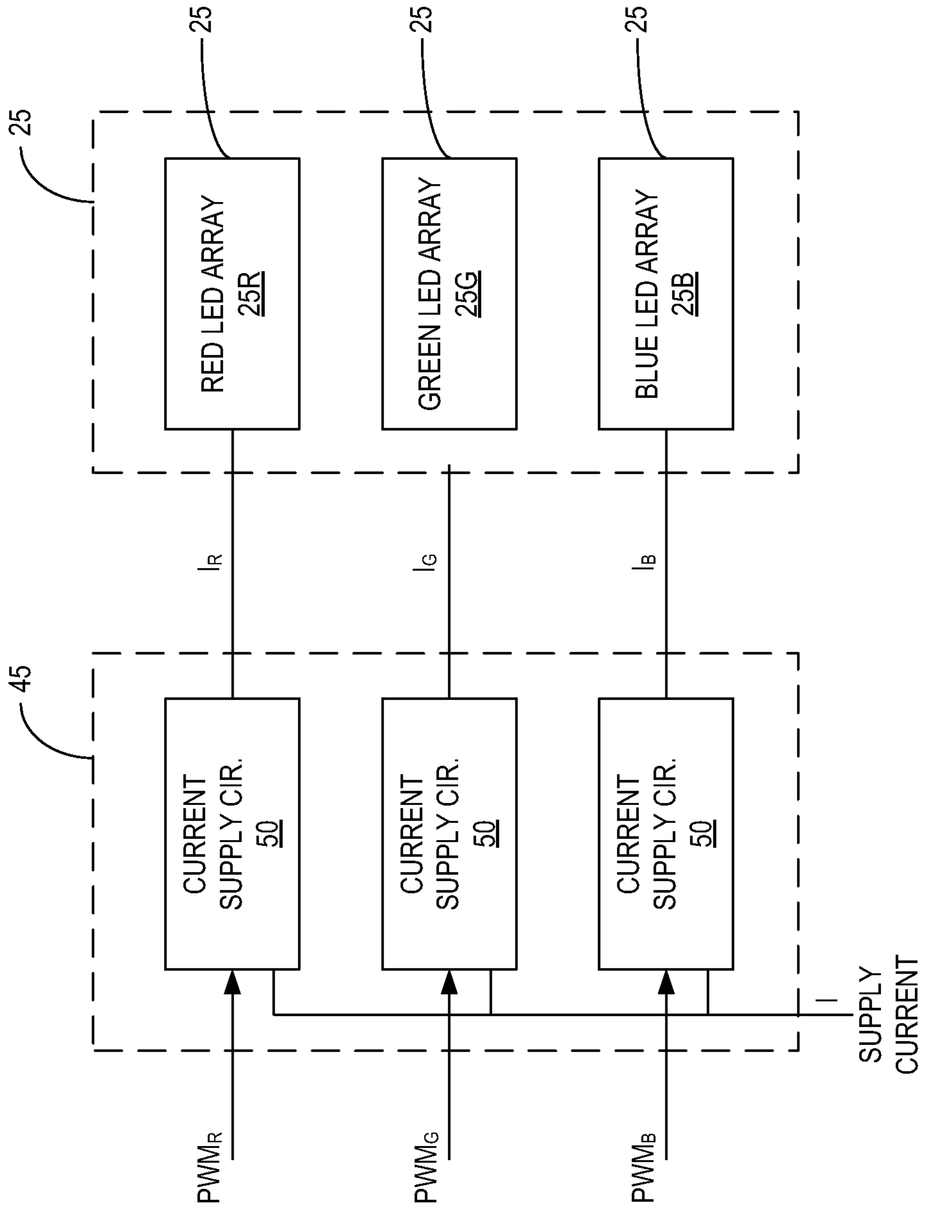
FIG. 2 illustrates an exemplary multicolor LED backlight.

The display assembly 10 comprises a display 15, backlight 20, and display control circuit 30. The display 15 may, for example, comprise a liquid crystal display (LCD). LCDs do not emit light directly, but rather rely on another light source, such as reflected light or a backlight. In exemplary embodiments of the present disclosure, the backlight 20 comprises a multi-color light emitting diode (LED) backlight 20 and serves as a light source for the display 15. FIG. 2 illustrates an exemplary backlight 20 comprising three separate LED arrays 25; a red LED array 25R, a green LED array 25G, and a blue LED array 25B. The red LED array 25R comprises a plurality of red LEDs, the green LED array 25G comprises a plurality of green LEDs, and the blue LED array 25B comprises a plurality of blue LEDs.

The display control circuit 30 controls the display 15 and backlight 20 to display images. The display control circuit 30 implements a form of content adaptive backlight control (CABC) to reduce the amount of power consumed by the backlight 20. In general, the display control circuit 30 performs linear histogram stretching and backlight control separately for two or more color channels in the image. Stretching the histograms of the displayed image allows the LED arrays 25 in the backlight 20 to be dimmed by a corresponding amount to reduce the power consumption of the backlight 20 without negatively impacting the user's perception of the image.

The display control circuit 30 comprises a histogram stretching circuit 35, CABC circuit 40, and backlight control circuit 45. An image to be displayed is input to the display control circuit 30. The CABC circuit 40 processes the displayed image to generate a histogram of transmittance values for two or more different color channels in the image. A color channel may comprise a primary color channel, such as red, green or blue, or a composite color channel, such as a white color channel. The choice of the color channels depends on the color channels in the backlight 20. The CABC circuit 40 computes a stretching factor f for each color channel based on its histogram. The CABC circuit 40 further determines the amount of dimming for each LED array 25 in the backlight 20 in dependence on a corresponding one of the stretching factors and generates backlight control signals to control the intensity of light emitted by the LEDs for each color channel.

The histogram stretching circuit 35 applies the stretching factors provided by the CABC circuit 40 to the corresponding transmittance values of the image to be displayed to generate a stretched image that is output to the display 15. The histogram stretching may be performed by multiplying the transmittance values of each pixel in an image by a corresponding stretching factor f. Because each color channel is independent in this example, the histogram stretching for all color channels may be performed in parallel.

The backlight control circuit 45 controls the current supply to each LED array 25 based on a corresponding backlight control signal from the CABC circuit 40. The backlight control signals may, for example, comprise pulse width modulated (PWM) signals that indicate to the backlight control circuit 25 the amount of current to be supplied to each LED array 25 in the backlight 20. The backlight control circuit 45 include multiple current supply circuits 50;

one for each LED array 25 in the backlight. The current supply circuits 50 receive an input current I and generate an output current to control the intensity of a corresponding LED array 25. Thus, each LED array 25 has a separate current supply that can be independently controlled. Thus, in embodiments of the present disclosure, the current supplied to each LED array 25 is independently controlled. An advantage of this arrangement is that, unlike conventional CABC techniques, it is possible to reduce the intensity of the backlight for one color channel even though another color channel may be saturated.

In the embodiment shown in FIG. 2, there are three primary color channels in the backlight 20: red, green and blue. In this example, the display control circuit 30 may perform histogram stretching and backlight control independently for each primary color channel. The CABC circuit 40 generates three histograms; one for each primary color channel. The CABC circuit 40 computes stretching factors, $f_R$, $f_G$, and $f_G$, separately for each of the primary color channels and provides the stretching factors for each primary color channel to the histogram stretching circuit 35. The histogram stretching circuit 35 uses the stretching factors $f_R$, $f_G$, and $f_G$, provided by the CABC circuit 40 to stretch the red, green and blue histograms of the image to generate a stretched image for output to the display 15. The CABC circuit 40 also determines the amount that each LED array 25 may be dimmed based on the stretching factors $f_R$, $f_G$, and $f_G$, and outputs power control signals $PWM_R$, $PWM_G$, and $PWM_B$ to the backlight control circuit 45 for each color channel. The current supply circuits 50 control the currents $I_R$, $I_G$, and $I_B$ to the LED arrays 25 in the backlight based on the backlight control signals $PWM_R$, $PWM_G$, and $PWM_B$.

Figure 3:
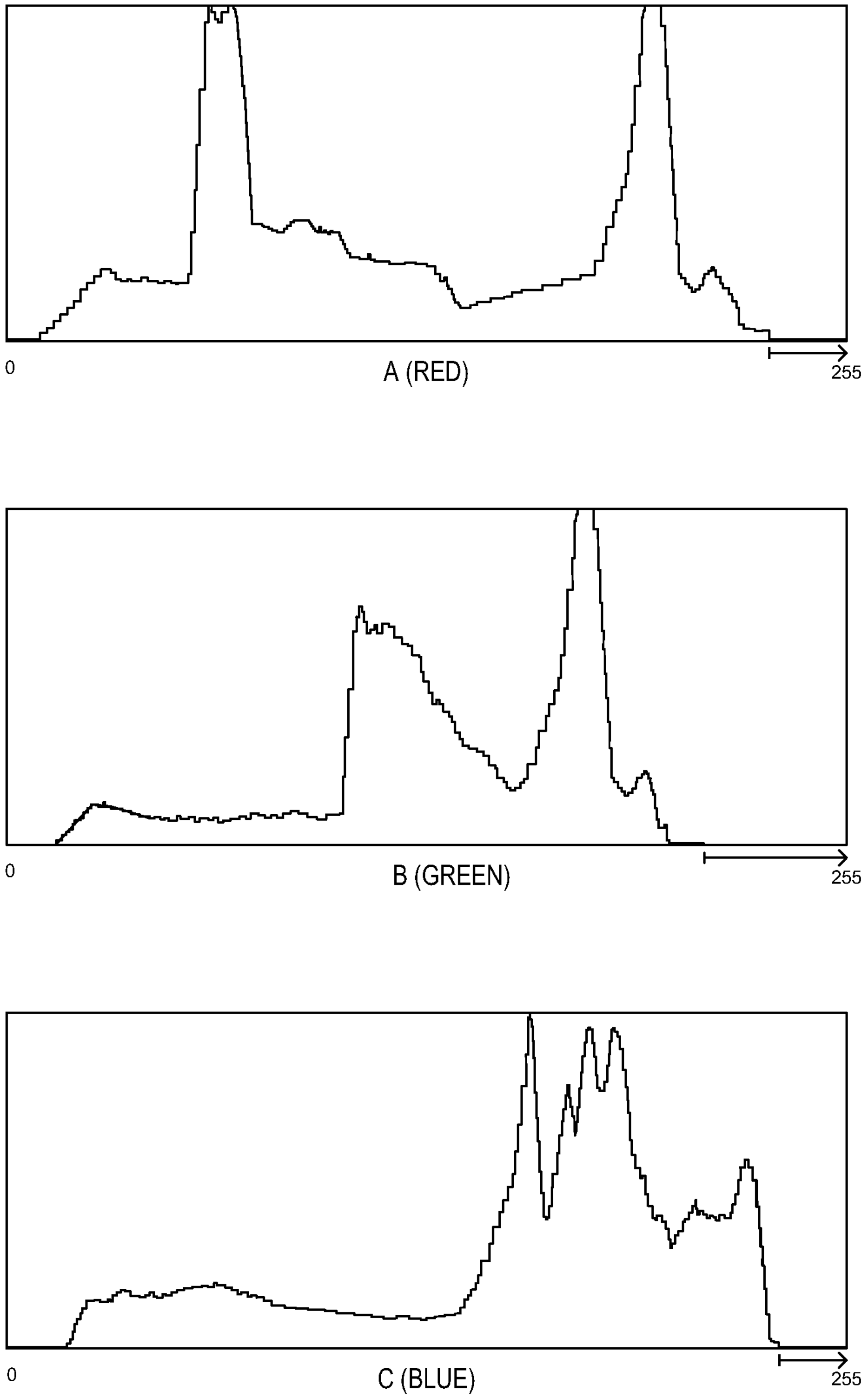
FIGS. 3A-3C illustrate exemplary histograms of an image for red, green and blue color channels.

FIGS. 3A-3C illustrate exemplary histograms of an image for red, green and blue color channels. As shown in these Figures, the blue color channel has higher transmittance values then the red and green color channels. If histogram stretching and backlight control are performed on a single histogram of the image, the amount of stretching, and hence the amount of power savings, is limited by the blue color channel. In this example, additional power savings are achieved by performing histogram stretching and backlight control separately for each color channel.

In some embodiments, non-linear histogram stretching could also be used rather than linear histogram stretching. Non-linear histogram stretching may yield higher savings on power consumption, but with the drawback of lower of image quality.

Figure 4:
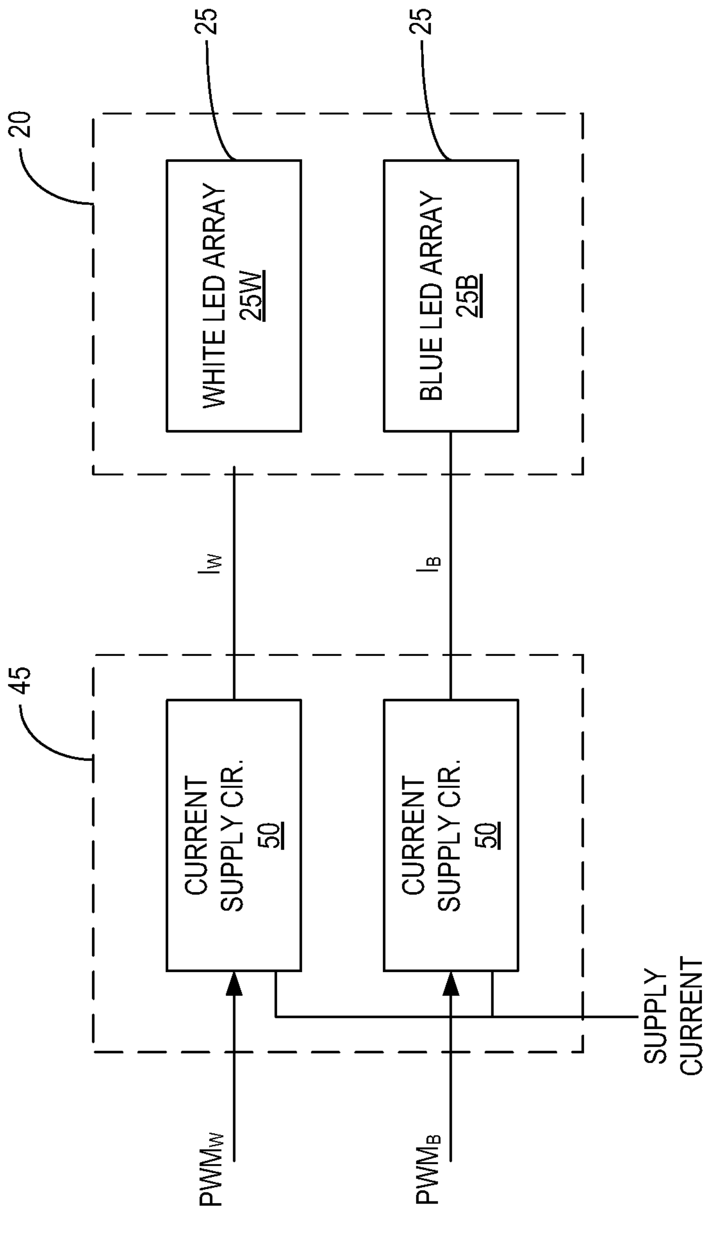
FIG. 4 illustrates another exemplary multicolor LED backlight.

FIG. 4 illustrates a backlight 20 according to a second embodiment of the disclosure. In this example, the backlight 20 comprises two LED arrays 25; a white LED array 25W and a blue LED array 25B. The current supplied to the white LED array 25W and the blue LED array 25B are independently controlled. In this example, the CABC circuit 40 computes a histogram of transmittance values for each color channel, i.e. the white color channel and blue color channel. Based on the histogram for the white color channel, the CABC circuit 40 computes a stretching factor $f_W$ and backlight control signal $PWM_W$ for the white color channel. Similarly, the CABC circuit 40 computes a stretching factor $f_B$ and backlight control signal $PWM_B$ for the blue color channel. It should be recognized, however, that the white color channel is a composite of the red, green and blue color channels. Stretching the histogram for the white color channel will impact the histogram of the blue color channel. Therefore, when computing the stretching factor $f_B$ for the blue color channel, the CABC circuit 40 should take into account the stretching performed on the white color channel. The histogram stretching circuit 35 may be configured to perform the histogram stretching in stages. In this example, the histogram stretching circuit 35 may stretch the histogram for the composite color channel (the white color channel) first. The histogram stretching circuit 35 may then perform histogram stretching of the blue color channel. The stretching should be performed in such a way that the maximum light transmittance value (e.g., 255 for a 24-bit system) is not exceeded for the blue color channel.

Figure 5:
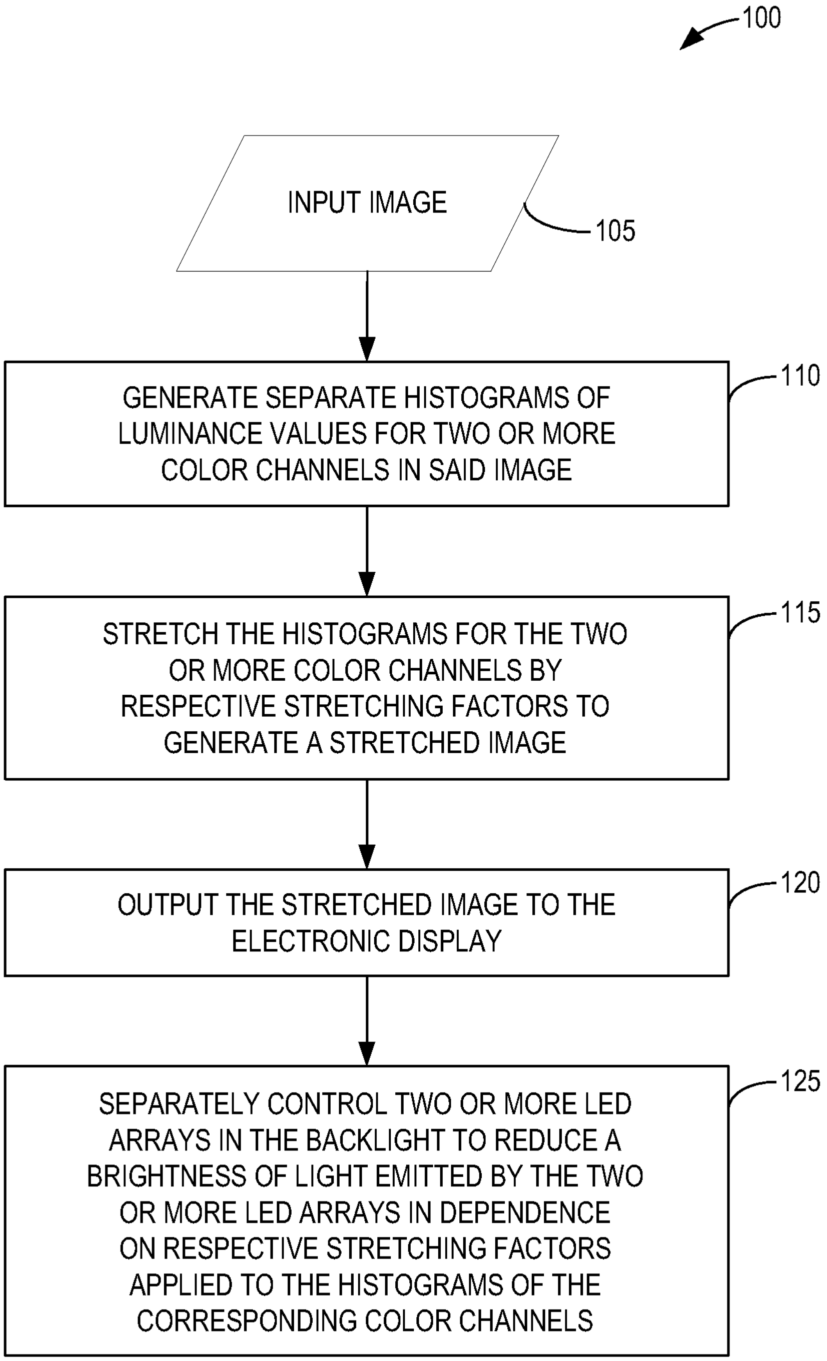
FIG. 5 illustrates an exemplary method of content adaptive backlight control.

FIG. 5 illustrates an exemplary method 100 of color dependent content adaptive backlight control. An image to be displayed on a display is input to the display control circuit (block 105). The display control circuit 30 generates separate histograms for two or more distinct color channels in the image (block 110) and stretches the histograms for the two or more color channels by respective stretching factors (block 115). The color channels for which histogram stretching is performed may comprise primary color channels (e.g. RGB channels) or composite color channels (e.g. a white color channel), or a combination thereof. In general, the histogram for each color channel is stretched to use full range of transmittance values, e.g., up to the maximum transmittance value. The stretched image is output to a display 15 (block 120). Two or more LED arrays 25 in the backlight 20 of the display 15 are separately controlled in dependence on the stretching factor applied to the histogram for the corresponding color channel to reduce the brightness (and thus the current consumption) of the backlight 20 (block 125). For example, assume that the backlight 20 includes red, green and blue LED arrays 25. The histogram for the red color channel in the image is stretched by a stretching factor $f_R$, the histogram for the green color channel is stretching for a stretching factor $f_G$, and the histogram for the blue color channel is stretched by a stretching factor FB. In this example, the LED arrays 25 of the backlight are controlled in dependence on respective stretching factors $f_R$, $f_G$, and $f_B$. Stretching the histograms of the displayed image increases the transmittance values of the pixels in the display 15 thus allowing the brightness of the backlight 20 to be reduced by a corresponding amount to reduce power consumption of the backlight 20.

Figure 6:
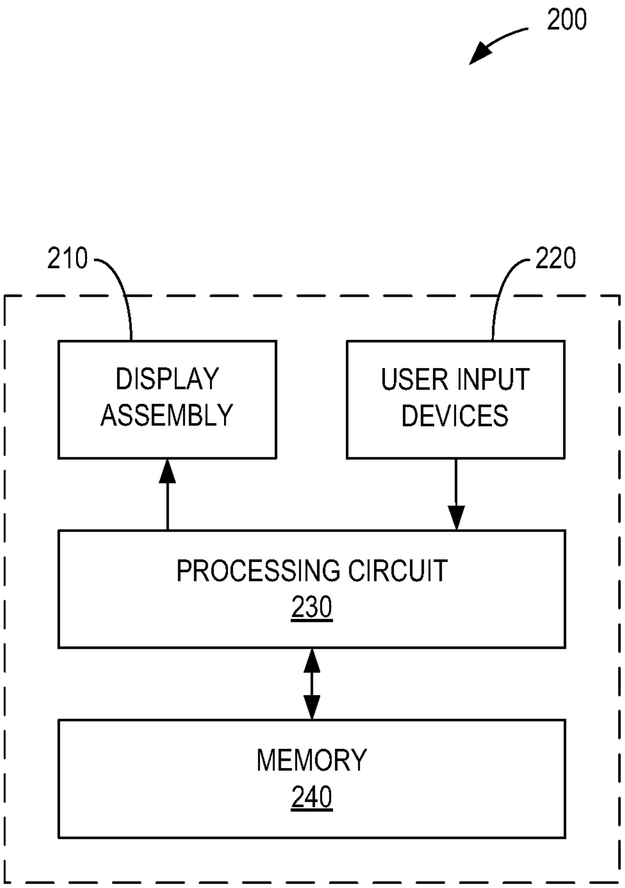
FIG. 6 illustrates an exemplary electronic device with a display assembly as herein described.

FIG. 6 illustrates an electronic device 200. The electronic device 200 comprises a display assembly 210, one or more user input devices 220, a processing circuit 230, and memory 240. The display assembly 210 may comprise a display assembly 10 as shown in FIG. 1 that implements content adaptive backlight control as herein described. The user input devices 220 may comprise a keyboard, keypad, touchpad, pointing device or other similar user input device. In some embodiments, the touch sensitive display may be used as an input device. Other types of user input devices include voice control input devices and jester controlled input devices. The processing circuit 230 receives user input from one or more of the user input devices and generates output to be displayed by the display assembly 210. Memory 240 stores program instructions and data needed by the processing circuit 230 for operation. The electronic device 200 may comprise, for example, a smartphone, tablet, laptop computer, notebook computer, a desktop computer, television, or other electronic devices that use a liquid crystal display.

The content adaptive backlight control techniques implemented in embodiments of the present disclosure allow for greater reduction in power consumption of the backlight without negatively impacting a viewer's perception of the displayed images. The content adaptive backlight control techniques are well-suited for portable electronic devices, such as smartphones and tablets, but are also useful in electronic device with fixed power supplies, such as televisions and display monitors.

The present disclosure may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of controlling power consumption of a backlight in an electronic display, wherein the backlight comprises two or more LED arrays, each corresponding to a respective color channel in an image to be displayed, the method characterized by:

generating separate histograms of transmittance values for two or more of said color channels in said image, the two or more of said color channels comprising primary color channels;

stretching the histograms for said two or more color channels by respective stretching factors to generate a stretched image, wherein stretching the histograms for said two or more color channels comprises stretching the histograms for each primary color channel independently;

displaying the stretched image on said electronic display; and separately controlling two or more led arrays in said backlight to reduce a brightness of light emitted by said two or more led arrays in dependence on respective stretching factors applied to the histograms for the corresponding color channels.

2. The method of claim 1, wherein the two or more color channels further comprises at least one composite color channel and wherein stretching the histograms for said two or more color channels further comprises stretching the histogram for a primary color channel in dependence on stretching of the histogram for the composite color channel.

3. The method of claim 1 wherein separately controlling two or more LED arrays in said backlight to reduce a brightness of light emitted by said two or more LED arrays in dependence on respective stretching factors for the corresponding color channel comprises reducing a supply current to each LED array proportionally to the stretching of the histogram for the corresponding color channel.

4. A display assembly for an electronic device comprising:

an electronic display;

a backlight for said electronic display including two or more LED arrays;

a control circuit for controlling the electronic display and backlight to reduce power consumption of the backlight, said control circuit configured to:

generate separate histograms of transmittance values for two or more of said color channels in said image, the two or more of the color channels comprising primary color channels;

stretch the histograms for said two or more color channels by respective stretching factors to generate a stretched image, wherein to stretch the histograms for said two or more color channels, the control circuit is configured to stretch the histograms for each primary color channel independently;

output the stretched image to said electronic display for display; and separately control two or more LED arrays in said backlight to reduce a brightness of light emitted by said two or more LED arrays in dependence on respective stretching factors for the corresponding color channel.

5. The display assembly of claim 4 wherein the two or more color channels further comprises at least one composite color channel and wherein, to stretch the histograms for said two or more color channels, the control circuit is further configured to stretch the histogram for a primary color channel in dependence on stretching of the histogram for the composite color channel.

6. The display assembly of claim 4 wherein, to separately control two or more LED arrays in said backlight, the control circuit is configured to reduce a supply current to each LED array proportionally to the stretching of the histogram for the corresponding color channel.

7. An electronic device comprising a user input device, a display including a backlight with two or more LED arrays, and a processor configured to receive user input via said user input device and to output information for display on said display, characterized by a control circuit for controlling the electronic display and backlight to reduce power consumption of the backlight, said control circuit configured to:

generate separate histograms of transmittance values for two or more of said color channels in said image, the two or more color channels comprising primary color channels;

stretch the histograms for said two or more color channels by respective stretching factors to generate a stretched image, wherein, to stretch the histograms for said two or more color channels, the control circuit is configured to stretch the histograms for each primary color channel independently;

output the stretched image to said electronic display for display; and separately control two or more LED arrays in said backlight to reduce a brightness of light emitted by said two or more LED arrays in dependence.

8. The electronic device of claim 7 wherein the two or more color channels further comprises at least one composite color channel and wherein, to stretch the histograms for said two or more color channels, the control circuit is further configured to stretch the histogram for a primary color channel in dependence on stretching of the histogram for the composite color channel.

9. The electronic device of claim 7 wherein, to separately control two or more LED arrays in said backlight, the control circuit is configured to reduce a supply current to each LED array proportionally to the stretching of the histogram for the corresponding color channel.

* * * * *